United States Patent [19]
Marcus

[11] 3,906,043
[45] Sept. 16, 1975

[54] WATER-SOLUBLE TETRACYCLINES

[76] Inventor: Israel Marcus, 52 Bansstraat, Amsterdam, Netherlands

[22] Filed: Sept. 6, 1974

[21] Appl. No.: 503,762

Related U.S. Application Data

[63] Continuation-in-part of Ser. No. 45,267, June 10, 1970, Pat. No. 3,846,486.

[30] Foreign Application Priority Data

June 12, 1969 United Kingdom............... 29968/69
June 7, 1974 Italy.................................. 23737/74

[52] U.S. Cl. ........................................ 260/559 AT
[51] Int. Cl.² ...................................... C07C 103/19
[58] Field of Search............................ 260/559 AT

[56] References Cited
UNITED STATES PATENTS

| | | | |
|---|---|---|---|
| 2,880,234 | 3/1959 | Maxion | 260/559 AT |
| 3,584,044 | 6/1971 | Korst | 260/559 AT |
| 3,795,707 | 3/1974 | Luciano | 260/559 AT |

*Primary Examiner*—C. Davis
*Attorney, Agent, or Firm*—Holman & Stern

[57] ABSTRACT

Water-soluble tetracycline derivatives are prepared by reacting a tetracycline with a methyleneaminosalicylate in the presence of a solvent selected from the group consisting of 1,2-dimethoxyethane, methyl ethyl ketone and mixtures thereof.

11 Claims, No Drawings

WATER-SOLUBLE TETRACYCLINES

This application is a continuation-in-part of my co-pending application Ser. No. 45,267, filed June 10, 1970, now U.S. Pat. No. 3,846,486.

BACKGROUND OF THE INVENTION

The present invention relates to a process for the preparation of tetracycline derivatives and specifically to an improved process for the production of the methyleneaminosalicylate/tetracycline complexes described and claimed in my aforementioned U.S. patent application Ser. No. 45,267. As in that application, the term "a tetracycline" is used in this specification generally to include the whole family of tetracycline antibiotics, such as chlortetracycline, oxytetracycline, 6-demethyl-7-chlortetracycline and 5-hydroxy-6-deoxy-6-methylene-tetracyclene, as well as tetracycline itself; and the term "a methyleneaminosalicylate" is used to denote methyleneaminosalicylates per se as well as methyleneaminosalicylic acid.

In my U.S. Pat. No. 3,846,486, I have described a method of producing these methyleneaminosalicylate/tetracycline complexes by reacting a methyleneaminosalicylate (e.g. sodium methyleneaminosalicylate and/or methyleneaminosalicylic acid) with a tetracycline in a suitable solvent, e.g. methanol. Of the solvents tried at that time, it was found that methanol gave undoubtedly the best results, in that it produced a stable complex of good colour. However, when operating the process on a commercial scale, it was found that the use of methanol had a disadvantage, in that the product produced was so fine and of so low a bulk density that it would easily form a smoke in air, thereby wasting considerable quantities of product, presenting a possible health hazard to workers and giving rise to a danger of contamination of other apparatus and processes. Moreover, as a result of the low bulk density of the product, it was difficult to pack into capsules of the desired small size. Furthermore, tetracycline has limited solubility in methanol, thereby giving rise to further process difficulties.

However, the complex produced by the process described in my U.S. Pat. No. 3,846,486 is highly soluble, has very low toxicity, and is extremely cheap to manufacture. In this respect, it differs from such materials as "Reverin", and the α-6-deoxy-5-oxytetracycline sulphosalicylate salt used as an intermediate in a purification process described in U.S. Pat. No. 3,397,231. Whereas "Reverin" (also known as rolitetracycline) is the N-(pyrrolidinomethyl)-derivative of tetracycline and is prepared by a Mannich reaction, and the sulphosalicylate of U.S. Pat. No. 3,397,231 is formed by reaction of the sulphonic acid group of 5-sulphosalicylic acid with the dimethylamino group of the tetracycline derivative, it is believed, although I do not wish to be limited by any theory, that the process of my invention in my U.S. Pat. No. 3,846,486 involves reaction of the methyleneamino group of the methyleneaminosalicylate with the tetracycline molecule to form a simple addition complex.

BRIEF SUMMARY OF THE INVENTION

It is, accordingly, an object of my invention to provide a water-soluble tetracycline derivative of the type described in my U.S. patent application Ser. No. 45,267 but which does not involve the processing difficulties associated with the use of methanol as a solvent.

Thus, in accordance with the present invention there is provided a process for the preparation of a methyleneaminosalicylate/tetracycline complex, in which a methyleneaminosalicylate is reacted with a tetracycline in a solvent which comprises 1,2-dimethoxyethane and/or methyl ethyl ketone. Preferably, one of these two solvents is used alone, although a mixture of the two may be used, as may one or both of the solvents in admixture with another miscible liquid.

Unexpectedly, I have found that the use of either of these two solvents enables the methyleneaminosalicylate/tetracycline complex to be produced in as good yields as are obtained with methanol, whilst overcoming the problems of low bulk density and of low tetracycline solubility; moreover, the quality of the product produced is equally good, and, in some respects, as will later become apparent it is even better. Like the complex produced by the process described in my U.S. Pat. No. 3,846,486, the product is highly soluble, has very low toxicity, and is extremely cheap to manufacture.

DETAILED DESCRIPTION OF INVENTION

In carrying out the process of the invention, the procedure I prefer to adopt is as follows:

The tetracycline (e.g. tetracycline itself, oxytetracycline, chlortetracycline etc.) and the methyleneaminosalicylate (e.g. sodium methyleneaminosalicylate or methyleneaminosalicylic acid) are dissolved in the solvent, either in one step to form immediately a single solution, or by dissolving the two reactants in two separate quantities of solvent to form two solutions, which are then mixed. So-called "technical grade" tetracycline may also be used. The reaction is preferably effected in an inert atmosphere and preferably in the absence of light. The methyleneaminosalicylate/tetracycline complex separates immediately. The precipitate is then filtered off, washed, if necessary, and dried, suitably in a vacuum, to remove residual solvent. The dried product will be without water of crystallization and, if it is desired to regain this, the product may be left in air for a suitable length of time.

The inert atmosphere used may comprise any inert gas, such as nitrogen or one or more of the noble gases, e.g. helium, neon or argon. However, in view of the comparative expense of the noble gases, I prefer to use nitrogen. Although, if the reaction is effected in the presence of oxygen, a precipitate is obtained, this precipitate lacks many of the desirable properties of the complex obtained by reaction in an inert atmosphere and, in particular, the product undergoes extremely rapid deterioration, both when isolated and when in solution, in contrast to the limited stability of the complex produced by reaction in an inert atmosphere.

Since the complex is somewhat light-sensitive, the reaction is preferably carried out in the absence of light. The washing may be carried out with any liquid in which the complex is not soluble or is substantially insoluble. In general, it is best to wash the precipitated complex with the same solvent as was used in the reaction, i.e. in the case of the present invention, 1,2-dimethoxyethane and/or methyl ethyl ketone; however, it is also possible to use methanol as the wash liquid.

The complex of the present invention is stable for a few hours in aqueous solution and it is this limited stability of the labile complex which makes it of particular advantage in therapeutic use. The advantages are of importance both when the complex of the invention is administered intravenously and when it is administered orally, but the complex may also be administered with advantage by other routes commonly adopted in tetracycline therapy. In general, the complex is best formulated for parenteral administration in a suitable injectible liquid, preferably water for injections, or in capsules in appropriate unit doses.

The invention is further illustrated with reference to the following Examples, of which Example 1 illustrates the preparation of the sodium methyleneaminosalicylate starting material; Examples 2 and 5 illustrate a process according to my U.S. Pat. No. 3,846,486; Examples 3, 4, 6, 11 and 12 illustrate the process of the present invention; and Examples 7 to 10 illustrate similar processes using other solvents.

EXAMPLE 1

20 g of sodium p-aminosalicylate were dissolved in a mixture of 75 ml of chemically pure ethanol and 150 ml of chemically pure acetone. The air was removed from the reaction vessel and replaced by nitrogen. The reaction vessel was screened from the light. 10 ml of formalin (an aqueous solution containing 35–40% formaldehyde) were then added. The pressure was atmospheric and temperature was ambient (about 25°C). The materials were allowed to react for about 6 hours, during which time a precipitate formed; this was filtered off, washed with small quantities of ethanol/acetone mixture (1:2 volume ratio) and then dried in vacuo until it was substantially free from solvent, which, in various experiments, took from 24 to 48 hours. The product consisted of white crystals, which discoloured when exposed to light and air. The yield was substantially 100% of theoretical.

EXAMPLE 2

2 g of tetracycline were dissolved in 125 ml of chemically pure methanol; meanwhile, 1 g of the sodium p-methyleneaminosalicylate produced in Example 1 was dissolved in 25 ml of chemically pure methanol. These two solutions were then mixed together under a nitrogen atmosphere in a vessel screened from the light; pressure was atmospheric and temperature was ambient. A yellow precipitate separated almost immediately, but, in order to allow the reaction to go to completion, the mixture was left for 0.5 hour. The precipitate was filtered off, washed with small quantities of methanol (which may, if desired, be replaced by acetone), and dried for 2 hours in vacuo. In order completely to remove the solvent, a few days further drying under vacuum were required.

The final product, obtained in an amount of 2.85 g (yield 95%), consisted of yellow crystals. 1 g of this complex dissolved completely in 100 ml of water to give a clear lemon yellow solution having a pH of 6.2–6.6. The presence of sodium in the material was demonstrated by the flame test and its distinction from tetracycline itself was further illustrated by the colour (red-violet, turning to yellow-orange on addition of two drops of water) given when 2 drops of 95% sulphuric acid were added to a trace of the complex; this contrasts with the more blue-violet colour given by tetracycline alone.

The product was of very low bulk density and the tetracycline starting material was comparatively unstable in the methanol solvent.

EXAMPLE 3

The process described in Example 2 was repeated, except that 40 ml of 1,2-dimethoxyethane were used as solvent and the preliminary drying only took 1 hour. The product yield was 95% of theory. The colour of the crystalline product was a somewhat brighter yellow, which is believed to indicate a greater purity and the product was of much reduced bulk density. On the other hand, the stability of a 1% aqueous solution was fractionally less than that of the product produced in methanol.

EXAMPLE 4

The process of Example 3 was repeated exactly, except that a nitrogen atmosphere was not employed, the reaction being carried out in the air. A product was obtained similar to that obtained in Example 3, except that the pH of a 1% solution differed by 0.3 from that of a similar solution of the product of Example 3; the pH of a 1% solution of the product of Example 3 was 6.2–6.6, whilst the pH of the product of the present Example was 5.9–6.3. This is believed to indicate that decomposition of the complex had commenced and the product would not, therefore, be acceptable for therapeutic use.

EXAMPLE 5

Example 2 was repeated exactly, except that the reaction was carried out in the presence of light. The results obtained are identical with those reported in Example 4.

EXAMPLE 6

The process described in Example 3 was repeated, except that chemically pure methyl ethyl ketone was used as solvent, in place of the 1,2-dimethoxyethane. The product was obtained in 95% yield and was a somewhat brighter yellow than the product of Example 2. The bulk density of the product of this Example was greater than that of the product of Example 2. The stability of a 1% aqueous solution of this product was slightly greater than that of the product of Example 3, but less than that of the product of Example 2.

EXAMPLES 7 to 10

The process of Example 2 was repeated, except that diethyl ether, cyclohexane, ethanol and benzene were used, in separate experiments, as the solvents. In most cases, solubility of both reactants in these common solvents was so limited that no reaction took place or, if a reaction did take place, no detectable product resulted. In the case of ethanol, the tetracycline dissolved, but the sodium p-methyleneamino-salicylate was essentially insoluble; some reaction took place giving a water-soluble product, but this was of low purity and stability and the yield was so low that the process would not be commercially viable.

Essentially identical results were obtained in these experiments when the tetracycline was replaced by, respectively, chlortetracycline and oxytetracycline.

EXAMPLE 11

1 g of oxytetracycline (Rachelle, Batch No. 06672)

was dissolved in 100 ml of methanol. Meanwhile, 0.5 g of sodium p-methyleneamino-salicylate (produced in Example 1) was dissolved in 30 ml of methanol. The two solutions were then mixed together in a vessel screened from the light under a normal atmosphere, at ambient temperature and pressure. The reaction was allowed to continue for 15 minutes, during which time a yellowish precipitate separated out.

This was separated from the reaction mixture and dried as described in Example 2.

The product was obtained in almost quantatative yield (except for minor losses due to manipulation) and was a bright yellow powder with a slight brownish tinge. The pH of a 1% solution of the product in water was 6.05.

Essentially similar results were obtained when the methanol was replaced by methyl ethyl ketone.

EXAMPLE 12

1 g of chlortetracycline (produced by conversion to the base of chlortetracycline. HCl, Rachelle, Batch No. 113500008) was dissolved in 100 ml of methyl ethyl ketone. Meanwhile, 0.5 g of sodium p-methyleneamino-salicylate was dissolved in 20 ml of methanol. The two solutions were mixed together under a normal atmosphere, at ambient temperature and pressure in a vessel screened from the light. The reaction was allowed to continue for 15 minutes, during which time a bright yellow precipitate separated out. This was separated from the reaction mixture, and dried as described in Example 2, to give a bright yellow powder. The yield of product was substantially quantitative (except for minor losses due to manipulation) and the pH of a 1% solution of the product in water was 6.1.

COMPARISON OF PRODUCTS OF EXAMPLES 2, 3 AND 6

These products were obtained, respectively, in methanol, 1,2-dimethoxyethane, and methyl ethyl ketone. It can be seen from the colour of the products that those obtained from the two latter solvents are purer than the product when methanol is used as solvent; in addition, the bulk densities of the products of Examples 3 and 6 are substantially greater than that of the product of Example 2. Moreover, tetracycline is both more stable in and more soluble in 1,2-dimethoxyethane and methyl ethyl ketone than it is in methanol, 1,2-dimethoxyethane being substantially better than methyl ethyl ketone in this respect. As a result of this greater solubility and stability, a much smaller quantity of dimethoxyethane need be employed than methanol.

On the other hand, the product obtained when using dimethoxyethane as solvent is somewhat less stable than the product obtained when using methanol as solvent, although the reason for this is not readily apparent. It has, however, been found that the stability of the product may be increased (although not quite to that of the product when using methanol as solvent) by increasing the proportion of sodium p-methyleneamino-salicylate to tetracycline.

I claim:

1. A process for the preparation of a methyleneaminosalicylate/tetracycline complex by the reaction of a methyleneaminosalicylate with a tetracycline in a solvent selected from the group consisting of 1,2-dimethoxyethane, methyl ethyl ketone, and mixtures thereof.

2. A process according to claim 1, in which said solvent consists of 1,2-dimethoxyethane.

3. A process according to claim 1, in which said solvent consists of methyl ethyl ketone.

4. A process according to claim 1, in which said tetracycline is tetracycline itself.

5. A process according to claim 1, in which said tetracycline is selected from the group consisting of chlortetracycline and oxytetracycline.

6. A process according to claim 1, in which said methyleneaminosalicylate is sodium p-methyleneaminosalicylate.

7. A process according to claim 4, in which said methyleneaminosalicylate is sodium p-methyleneaminosalicylate.

8. A process according to claim 1, effected in an inert atmosphere.

9. A process according to claim 8, in which said inert atmosphere is nitrogen.

10. A process according to claim 1, effected in the absence of light.

11. A process according to claim 1, effected at atmospheric pressure and ambient temperature.

* * * * *